US012561186B2

(12) United States Patent
Khambete et al.

(10) Patent No.: US 12,561,186 B2
(45) Date of Patent: Feb. 24, 2026

(54) CONNECTED REFERENCE ARCHITECTURE AND TOOLKIT

(71) Applicant: Cognizant TriZetto Software Group, Inc., Englewood, CO (US)

(72) Inventors: Kiran Khambete, Maharashtra (IN); Shardul Pradhan, Maharashtra (IN)

(73) Assignee: COGNIZANT TRIZETTO SOFTWARE GROUP, INC., Denver, CO (US)

( * ) Notice: Subject to any disclaimer, the term of this patent is extended or adjusted under 35 U.S.C. 154(b) by 494 days.

(21) Appl. No.: 17/389,691

(22) Filed: Jul. 30, 2021

(65) Prior Publication Data

US 2024/0095107 A1    Mar. 21, 2024

Related U.S. Application Data

(60) Provisional application No. 63/058,860, filed on Jul. 30, 2020.

(51) Int. Cl.
  G06F 9/54       (2006.01)
  G16Y 10/75      (2020.01)
(52) U.S. Cl.
  CPC .............. G06F 9/547 (2013.01); G06F 9/546 (2013.01); G16Y 10/75 (2020.01)
(58) Field of Classification Search
  CPC .......... G06F 9/547; G06F 9/546; G16Y 10/75
  See application file for complete search history.

(56) References Cited

U.S. PATENT DOCUMENTS

| | | | | |
|---|---|---|---|---|
| 2019/0171438 A1* | 6/2019 | Franchitti | .............. | G06N 20/00 |
| 2019/0364492 A1* | 11/2019 | Azizi | ...................... | H04L 67/12 |
| 2020/0336376 A1* | 10/2020 | Mahdi | ...................... | G06N 5/04 |
| 2022/0303348 A1* | 9/2022 | Glaser | .................. | H04L 63/168 |

OTHER PUBLICATIONS

Deol et al., Advancing the Industrial Internet of Things; Dec. 12, 2019; 25 pages (Year: 2019).*
Microsoft Azure IoT Reference Architecture; Version 2.1; Sep. 26, 2018; https://download.microsoft.com/download/A/4/D/A4DAD253-BC21-41D3-B9D9-87D2AE6F0719/Microsoft_Azure_IoT_Reference_Architecture.pdf; 71 pages (Year: 2018).*
"CoReART, Connected Reference Architecture & Toolkit," Cognizant, Copyright 2020, 9 pp.
"Reference Architecture—Reusable Components," Cognizant, Copyright 2018, 24 pp.
"CoreART—Reusable Components," Cognizant, Copyright 2018, 12 pp.
Michael Weyrich, et al., "Reference Architectures for the Internet of Things," IEEE Software, DOI: 10.1109/MS.2016.20, Jan. 2016, 7 pp.

* cited by examiner

*Primary Examiner* — Kevin L Young
*Assistant Examiner* — Kimberly L Jordan
(74) *Attorney, Agent, or Firm* — Dawn-Marie Bey; Bey & Cotropia PLLC

(57)         ABSTRACT

A system supporting one or more Internet-of-Things (IoT) applications for enabling repeatable use cases includes a reference architecture and a toolkit including re-usable components. The re-usable components are selectable to support the one or more IoT applications to enable the repeatable use cases which require access to data from multiple individual devices accessible via a cloud platform.

17 Claims, 12 Drawing Sheets

Platform Agnostic

Platform Dependent

CONNECTED REFERENCE ARCHITECTURE AND TOOLKIT

CROSS-REFERENCE TO RELATED APPLICATIONS

The present application claims the benefit of priority to U.S. Provisional Patent Application No. 63/058,860, "Connected Reference Architecture and Toolkit" which was filed on Jul. 30, 2020 and which is incorporated herein by reference in its entirety.

FIELD OF EMBODIMENTS

The subject matter described herein, in general, relates to implementation of Internet of Things (hereafter IoT) solutions and more particularly to IoT architectures which utilize pieces of reference code that are device and cloud platform agnostic to implement services.

BACKGROUND

Whether to cut costs, improve the customer and/or employee experience, facilitate remote working or re-imagine products and services, organizations across industries are exploring the potential of the Internet of Things (hereafter IoT). IoT refers to the connection of things to the internet and all of the benefits, e.g., data sharing, data processing, data storing, and the like, which may result from IoT connections. The connected things in the IoT may be sensors, which collect information that may be sent over IoT connections, computers/processors which receive and act on received data and things that can both send and receive. The ability for an enterprise to establish and maintain secure IoT connections is invaluable.

The major challenges facing businesses and industries looking to take advantage of IoT opportunities include, among others, security, connectivity and compatibility. At the heart of IoT is the decentralization of the network, wherein many (thousands, millions, billions) of devices are able to securely exchange information. These devices may operate using diverse firmware and protocols, which then requires additional hardware/software to ensure compatibility between diverse devices. Within specific industries and domains, there may be numerous ad hoc solutions which cannot easily be expanded or re-used due to lack of standardized architectures and protocols.

Ideally, an IoT reference architecture would provide a common vocabulary across many different domains and implementations. In the article by Weyrich et al. entitled Reference Architectures for the Internet of Things, IEEE Software, January 2016, which is incorporated herein by reference in its entirety; brief descriptions and comparisons between initial reference architectures proposed by various industry players are summarized and compared. But the article ends with a list of remaining deployment hurdles. Accordingly, there remains a need in the art for an IoT reference architecture and supporting toolkit which provides a standardized template solution usable across industries and domains.

SUMMARY OF EMBODIMENTS

In a first exemplary embodiment, a system supporting one or more Internet-of-Things (IoT) applications for enabling repeatable use cases is described. The system includes: a reference architecture including a set of architectural patterns for supporting the one or more Internet-of-Things (IoT) applications; and a toolkit including re-usable components; wherein the re-usable components are selectable to support the one or more IoT applications to enable the repeatable use cases; and further wherein the repeatable use cases require access to data from multiple individual devices accessible via a cloud platform.

In a second exemplary embodiment, a toolkit implemented on one or more processors for supporting one or more Internet-of-Things (IoT) applications for enabling repeatable use cases in accordance with a predetermined reference architecture in described. The toolkit includes: multiple re-usable components, including repeatable code, the multiple re-usable components being selectable to support the one or more IoT applications to enable the repeatable use cases, wherein the repeatable use cases require access to data from multiple individual devices accessible via a cloud platform; and further wherein the multiple re-usable components are device-agnostic and cloud platform-agnostic.

In a third exemplary embodiment, at least one computer-readable medium storing instructions that, when executed by one or more computers, performs a process for engaging one or more microservices to support a repeatable use case which requires access to data from multiple individual devices accessible via a cloud platform is described. The process includes: initiating synchronous communication between the one or more microservices and a cloud platform-agnostic re-usable component using a RESTful application programming interface (API); and initiating asynchronous message-based communication between the one or more microservices and cloud platform-dependent components using SDKs.

BRIEF DESCRIPTION OF FIGURES

The invention will be described with respect to specific embodiments thereof, and reference will be made to the drawings, in which.

DETAILED DESCRIPTION

Figure 1A:
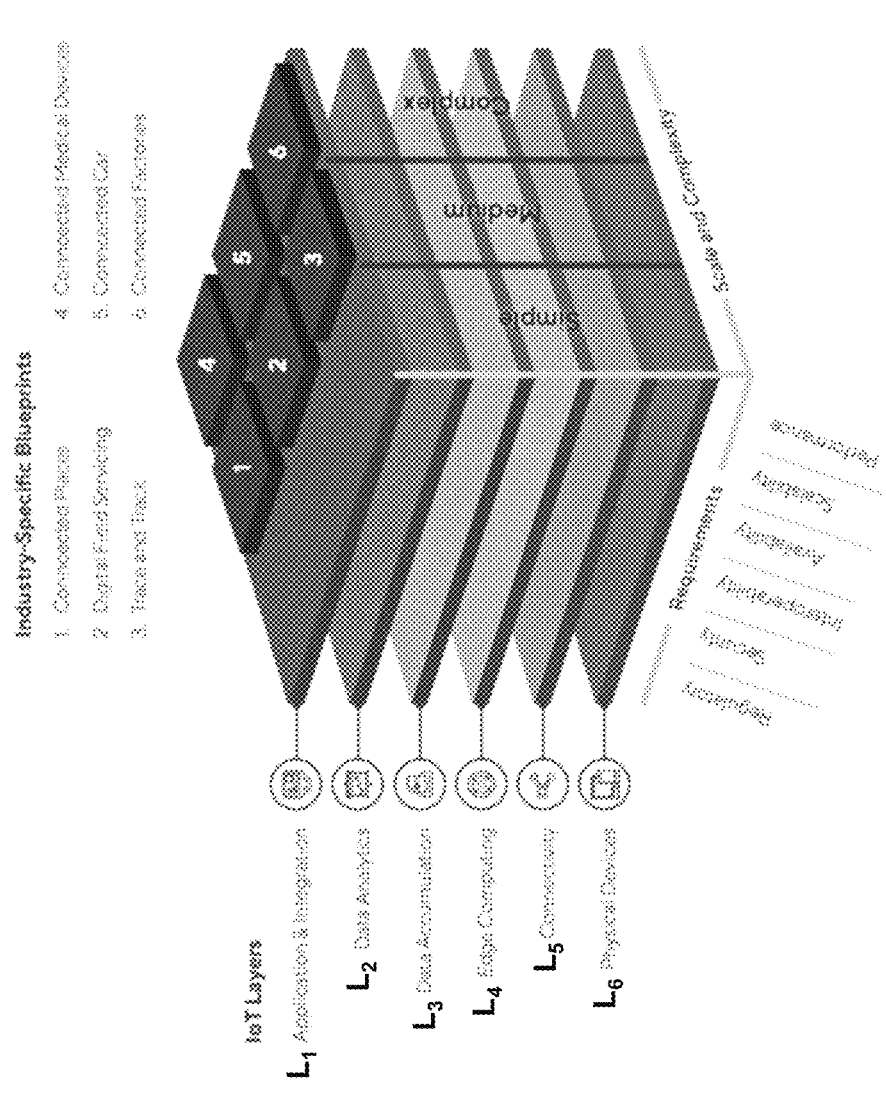
FIGS. 1a, 1b, 1c, 1d, 1e are descriptive views of a reference architecture and toolkit and features thereof in accordance with embodiments described herein.

A Reference Architecture RA is a comprehensive set of architectural patterns that address both common IoT requirements and broader enterprise needs. Ready-to-use templates (or blueprints) are based on the size and complexity of IoT programs as illustrated in the exemplary layered architecture stack shown in FIG. 1a. IoT layers in the FIG. 1a example include: Applications & Integration $L_1$, Data Analytics $L_2$, Data Accumulation $L_3$, Edge Computing $L_4$, Connectivity $L_5$, and Physical Devices $L_6$. Organizations can select components and services to implement a specific use case. These templates meet industry-specific needs. Exemplary industry-specific blueprints include, e.g., connected places 1, digital field servicing 2, trace and track 3, connected medical devices 4, connected car 5, connected factory 6. The requirements to be met by the architecture include, e.g., regulatory, security, interoperability, availability, scalability, and performance. In FIG. 1a, the exemplary industry specific blueprints are also provided with a general indicator of scale and complexity. So, for example, blueprints 1, 2, 3 are indicated as being of medium scale and complexity, while blueprints 4, 5, 6 are indicated as being more complex than 1, 2, 3.

Figure 1B:
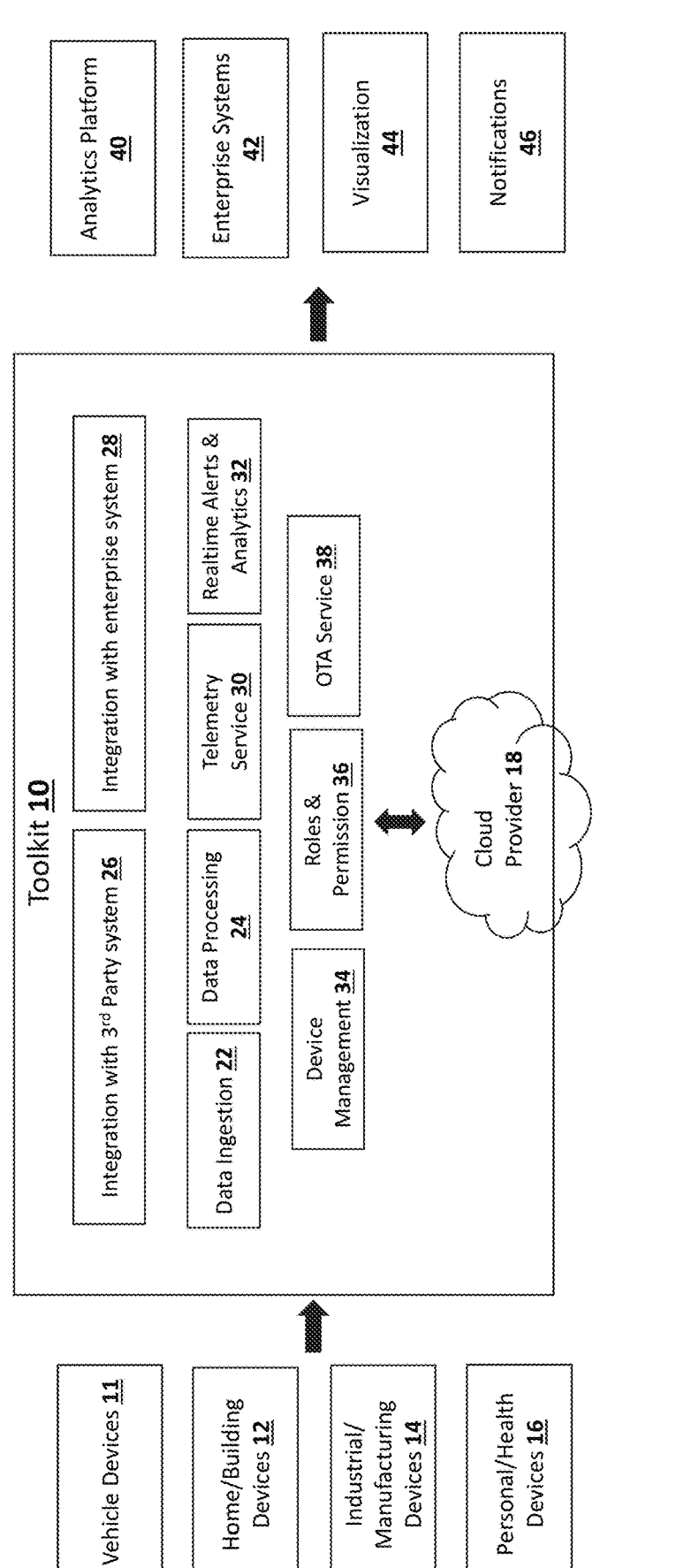

Following the RA of FIG. 1a, FIG. 1b provides a high level view of a toolkit 10 which supports different IoT applications and drives rapid deployment of repeatable use cases. The toolkit 10 is device (and industry) agnostic, facilitating connectivity with, e.g., vehicle devices 11, home/building devices (appliances, thermostats, etc.) 12, industrial/manufacturing devices (construction equipment, warehouse devices, manufacturing equipment, etc.) 14, personal/health devices (phone, personal health tracking devices such as watches, scales, blood pressure monitors) 16, etc. as required to support business use cases. As would be readily understood by one skilled in the art, this device listing is not exhaustive. Toolkit 10 is also generally independent of the type of underlying cloud services platform, e.g., Azure, AWS, Google Cloud, etc., 18, while still taking advantage of cloud service functional features, scale, availability, and disaster recovery.

Toolkit 10 supports, among other services, data ingestion 22, data processing 24, integration with third-party system(s) 26, integration with enterprise system(s) 28, telemetry service(s) 30, real-time alerts and analytics 32, device management 34, roles and permissions 36 and over-the-air (OTA) service 38. Toolkit 10 further facilitates communication and integrations with, e.g., analytics platforms 40, enterprise system(s) 42, visualization applications 44 and notification applications 46.

Figure 1C:
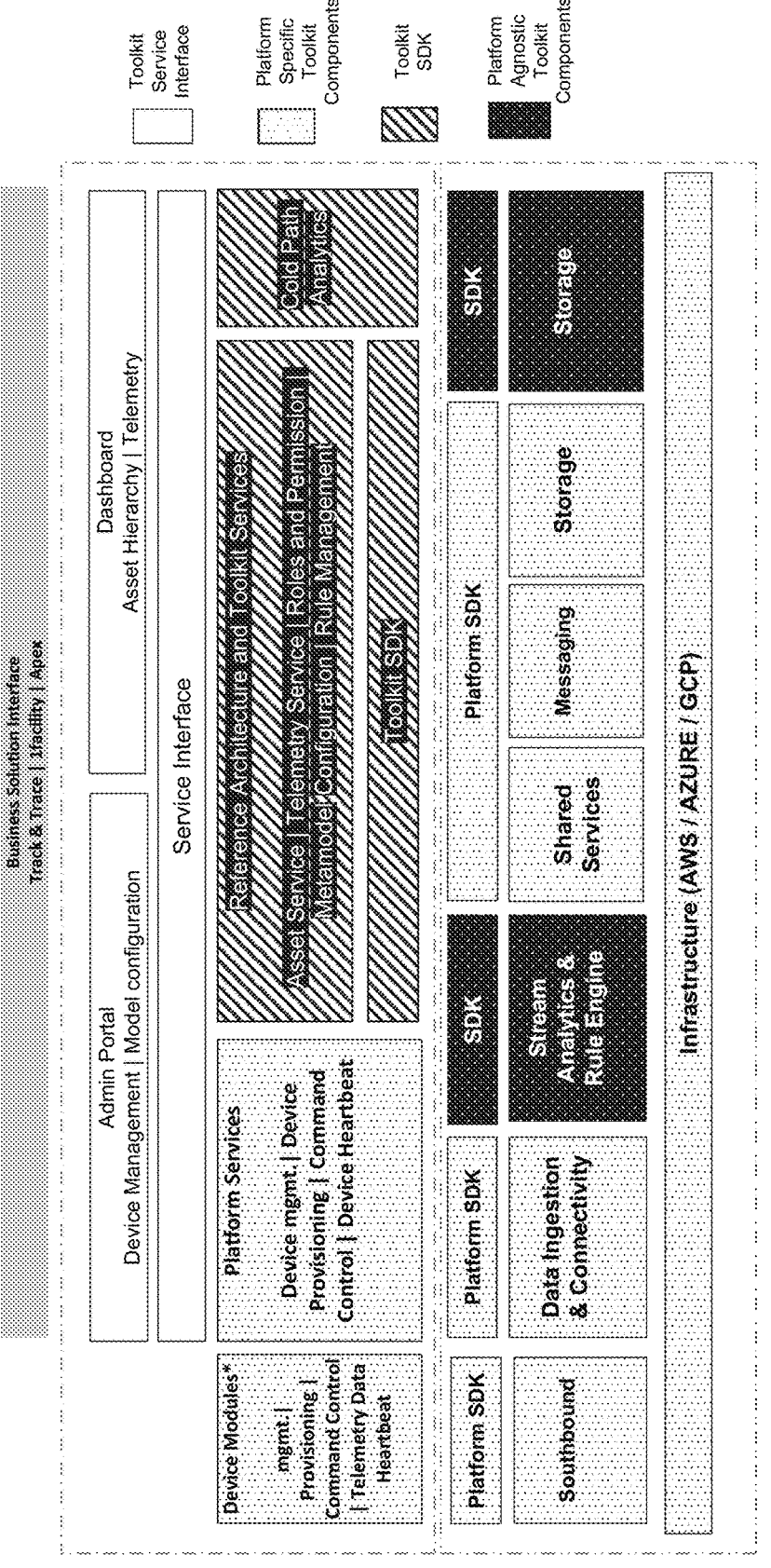

In FIG. 1c, a comprehensive view of an end-to-end technology model implementing the RA with toolkit is shown, highlighting components which are cloud platform dependent versus cloud platform agnostic.

Figure 1D:
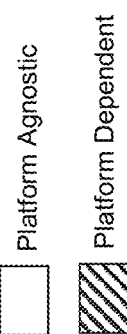
Figure 1D:
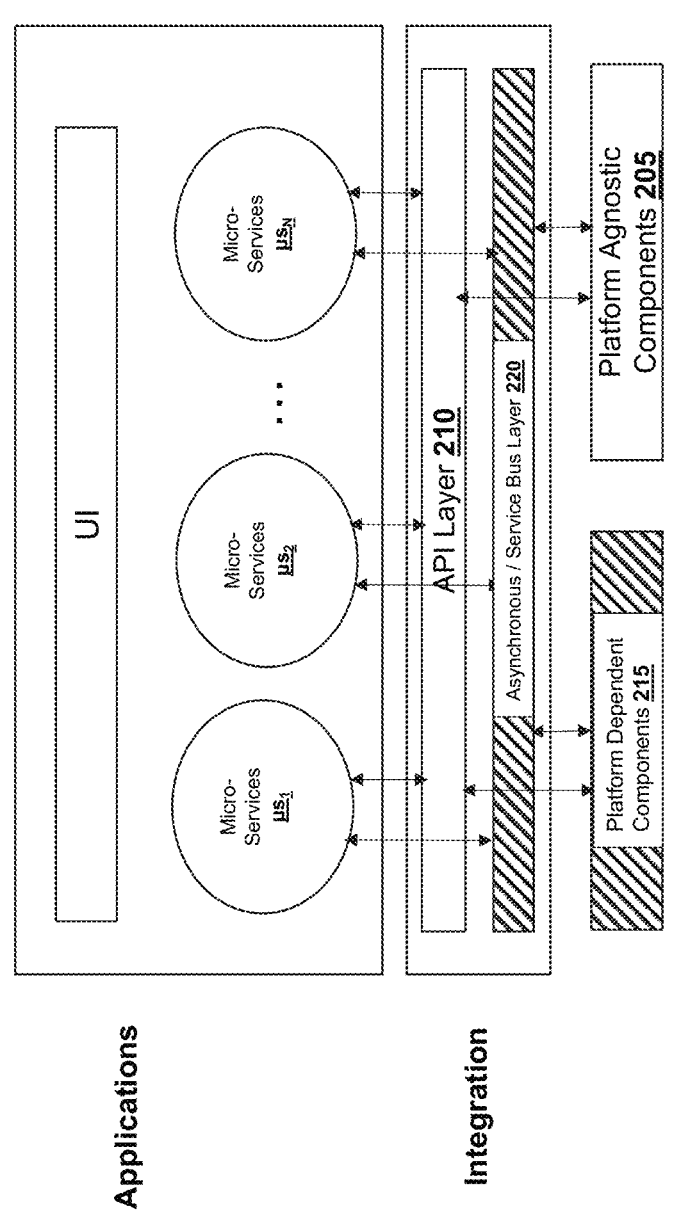

Referring to FIG. 1d, a schematic of an exemplary Applications & Integration layer $L_1$ implemented in accordance with the RA model and toolkit is shown. In a preferred implementation, applications include platform-agnostic components/services 205, wherein the supporting code is the same irrespective of the cloud services platform and integration is enabled through the API layer 210. The embodiment also supports platform specific (dependent), event-based components/services 215 integrated through an asynchronous/service bus layer 220 with custom SDK. Thus the reusable components provide two different ways in which consuming applications can use the components: RESTful APIs for synchronous communication and SDK's to interact with asynchronous message-based communications. Micro-services, $\mu s_1$ to $\mu s_N$, may be hosted and deployed using a container deployment and orchestration platform such as that supported by Kubernetes, an event streaming platform such as Kafka, and database services such as MySQL and MongoDB.

Figure 1E:
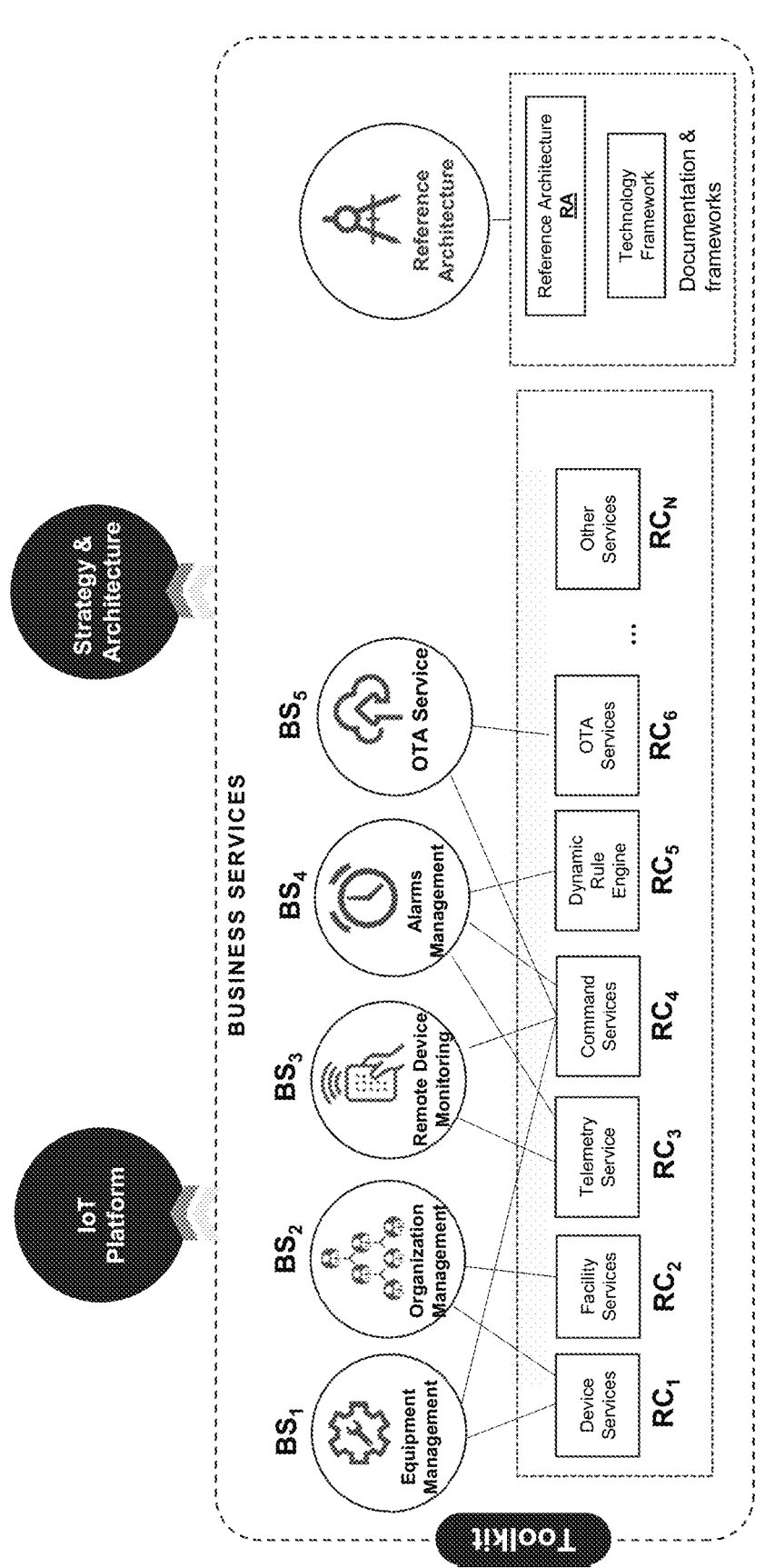

FIG. 1e provides a high level schematic representation of the toolkit's core foundational components including reusable components $RC_{1 \ldots N}$, i.e., code, and reference architecture RA, including technology framework and documentation. As exemplified in FIG. 1e, reusable components $RC_1 \ldots N$ are reference implementations in the form of re-usable, sample code that requires only minimal customization to implement complex architecture patterns such as large-scale data ingestion and routing and managing device configurations on leading IoT cloud platforms (e.g., Amazon Web Services (AWS), Microsoft Azure, Google Cloud Platform). FIG. 1e also provides visualization of how certain business services would link up with the reusable components. For example: $BS_1$ (Equipment Management) utilizes $RC_1$ (Device Services) and $RC_4$ (Command Services); $BS_2$ (Organization Management) utilizes $RC_1$ (Device Services) and $RC_2$ (Facility Services); $BS_3$ (Remote Device Monitoring) utilizes $RC_3$ (Telemetry Service) and $RC_4$ (Command Services); $BS_4$ (Alarms Management) utilizes $RC_3$ (Telemetry Service), $RC_4$ (Command Services) and $RC_5$ (Dynamic Rule Engine); and $BS_5$ (OTA Service) utilizes $RC_4$ (Command Services) and $RC_6$ (OTA Services).

By way of example only, reusable components (RC), i.e., code, support services such as: device services (e.g., enrollment, provisioning); device management; command management; software management (e.g., over-the-air (OTA)); telemetry; and dynamic rule engine services. The RC is available in the toolkit and is intended to be generic and re-usable in the sense that it can be used within IoT scenarios with differing business, industry, use-case and with differing cloud platforms. The following paragraphs describe certain RC functionality and provide exemplary implementation architectures. The examples and accompanying figures use terminology and individual schematic components which are used in Microsoft's Azure cloud service documentation. The embodiments are not intended to be limited to use with the Azure cloud services. The functionality may be implemented in other cloud service platforms.

The device enrollment and provisioning services reusable components can support integration with secure secret stores, such as Microsoft's Azure Key Vault, metadata storage and bulk operations for bulk device enrollments using, e.g., keys (TPM and symmetric) and certificates. Functionally, the service is able to enroll devices, enroll group, create and maintain certificates/keys, create device twin per device type while enrolling, maintain metadata for device in metadata store and provide proof of possession flow for certificates. These services have been limited in prior art IoT platforms.

Figure 2:
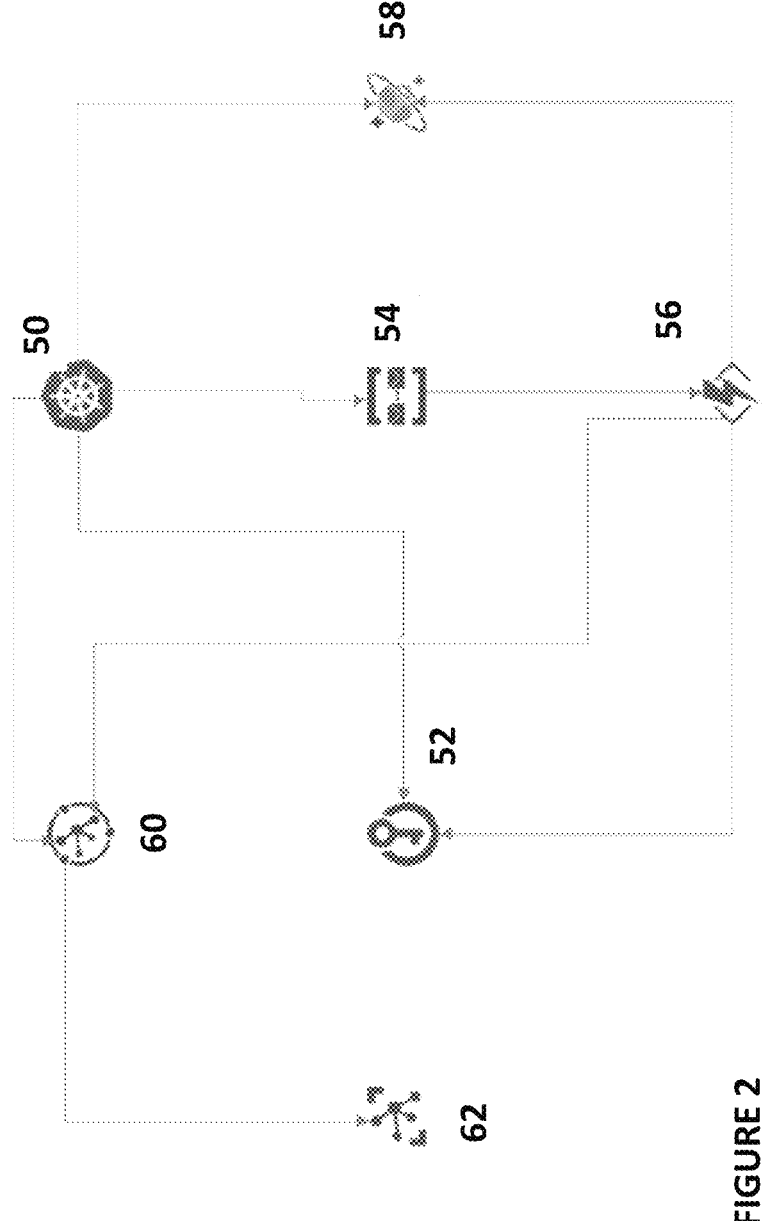
FIG. 2 illustrates exemplary architecture and process flow for a device enrollment and provisioning micro service in accordance with an embodiment herein.

FIG. 2 illustrates exemplary architecture and process flow for a device enrollment and provisioning micro service in accordance with an embodiment herein. Individual, bulk, group enrollment is initiated through the enrollment API 50 using, e.g., CSV. Generated certificates and keys are stored in the secure key storage 52. A bulk enrollment queue 54 is used for bulk enrollment notification, with bulk enrollment requests processed through the bulk enrollment function 56. Enrolled device metadata is stored in metadata storage 58. The device provisioning API 60 is the endpoint for device auto-provisioning and the IoT hub 62 is the message broker.

The device management reusable components support creation of device meta models, maintenance of device metadata and device management and device heartbeat monitoring. These services address prior art limitations of IoT platforms which did not provide production level device connection state and imposed throttling for device twin/ identity queries. The present platform provides APIs for device operations and management with external storage for meta model storage to remove throttling limitations imposed when queries are required to go through the IoT hub. Device management functions include enable/disable, deletion and setting desire properties. Additional functions include searching using stored device metadata.

Figure 3:
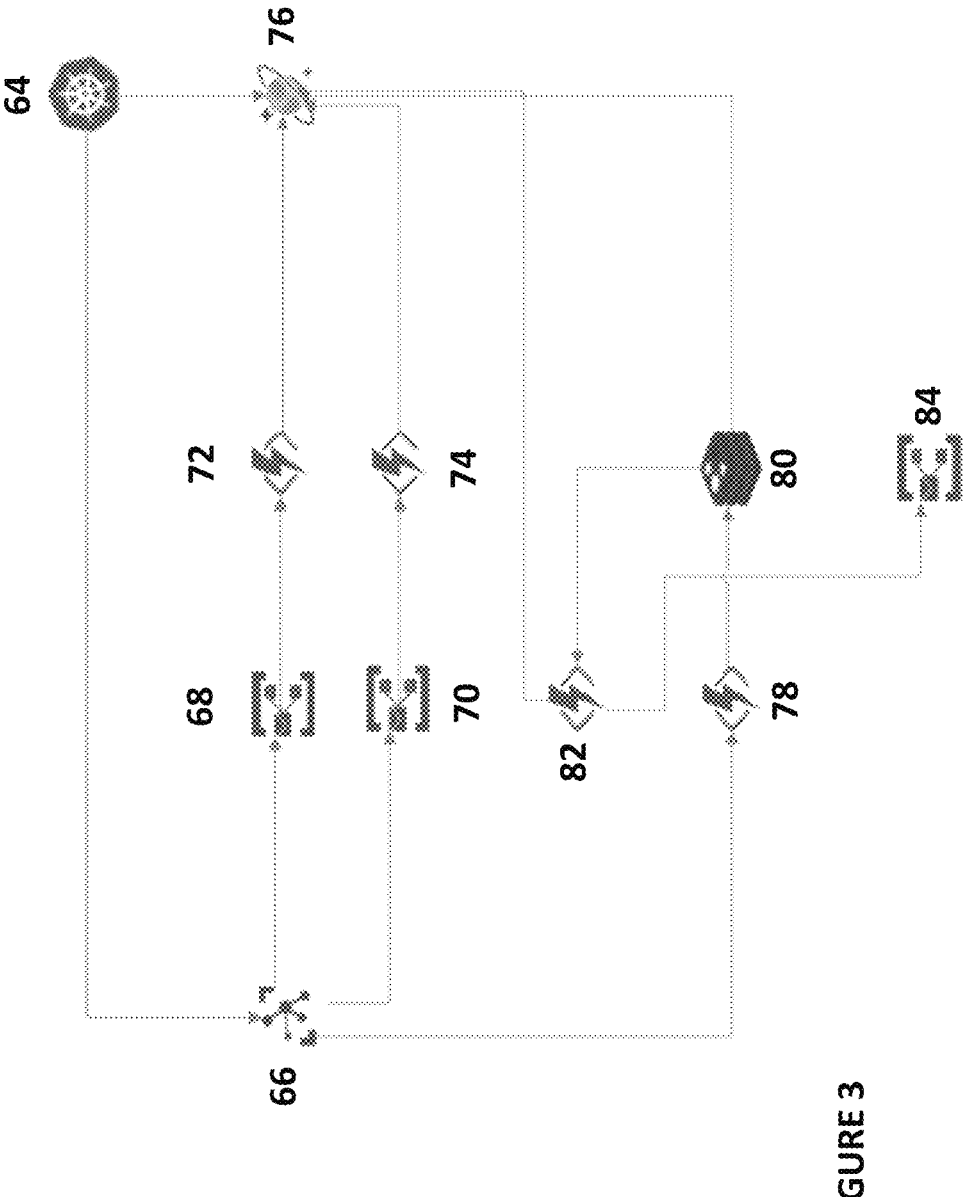
FIG. 3 illustrates exemplary architecture and process flow for device management in accordance with an embodiment herein.

FIG. 3 illustrates exemplary architecture and process flow for device management in accordance with an embodiment herein. From the device management API 64, device queries, device updates and device deletion messages originate from the IoT hub 66 as device lifecycle event topic 68 or device twin topic 70 messages and resulting device lifecycle event 72 or device twin 74 functions, with results stored in metadata storage 76. Also originating from device management API 64 by way of IoT hub 66 is request for heartbeat monitoring via heartbeat cache function 78 and an in-memory, open-source data store 80, such as Redis cache. The result of the monitoring, e.g., device connection status 82 is stored in metadata storage 76 and output as a status notification message 84.

The command management service reusable components provide the ability to send commands to devices and keep track of the commands for their status and command end-to-end lifecycle management. This was previously unavailable in prior art IoT platforms. Specific functions include: sending direct method commands; sending cloud-to-device (C2D) commands in synchronous and asynchronous modes and command lifecycle management with expiry and status. For state management, the commend management service is able to: expire time for a command; track commands in a database; auto-expire a command after expiry time and track status of command with response.

Figure 4:
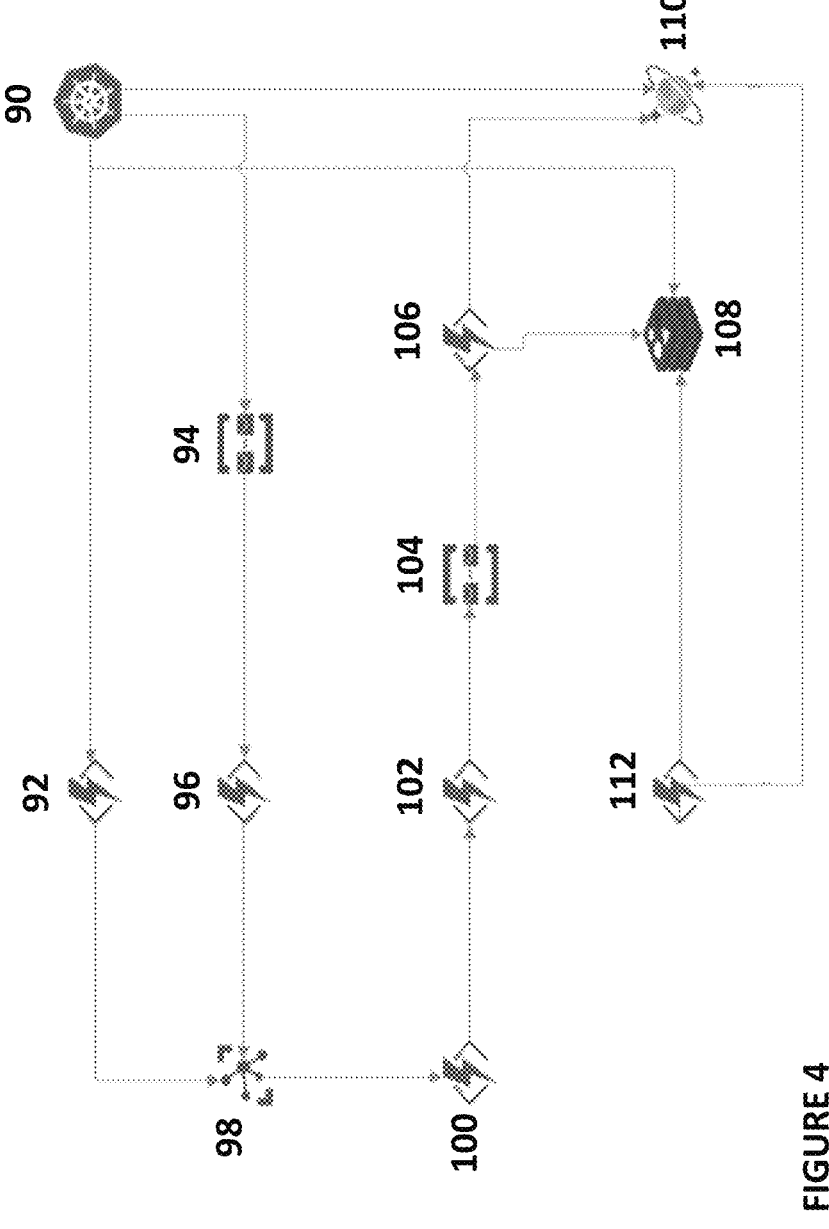
FIG. 4 illustrates exemplary architecture and process flow for command management services in accordance with an embodiment herein.

FIG. 4 illustrates exemplary architecture and process flow for command management services in accordance with an embodiment herein. The command API 90 can initiate direct method function 92 or use C2D message queue 94 to implement C2D message function 96 to instruct IoT hub 98. From IoT hub 98, routing function 100 routes commands and a command response function 102 collects responses at response hold queue 104 and applies a response persistence function 106 with results stored in an in-memory, open-source data store 108, such as Redis cache. The initial direct method command from API 90 is also stored in data store 108. While all initial commands from command API 90 and persistence function 106 results are also stored in command storage 110. And command expiry management function 112 results are stored in both data store 108 and command storage 110.

The software management service reusable components provides the ability to create and upload update packages and qualification criteria through APIs and broadcast OTA for eligible devices. This functionality also supports tracking of campaign status and history. Software management functionality was previously unavailable in prior art IoT platforms.

Figure 5:
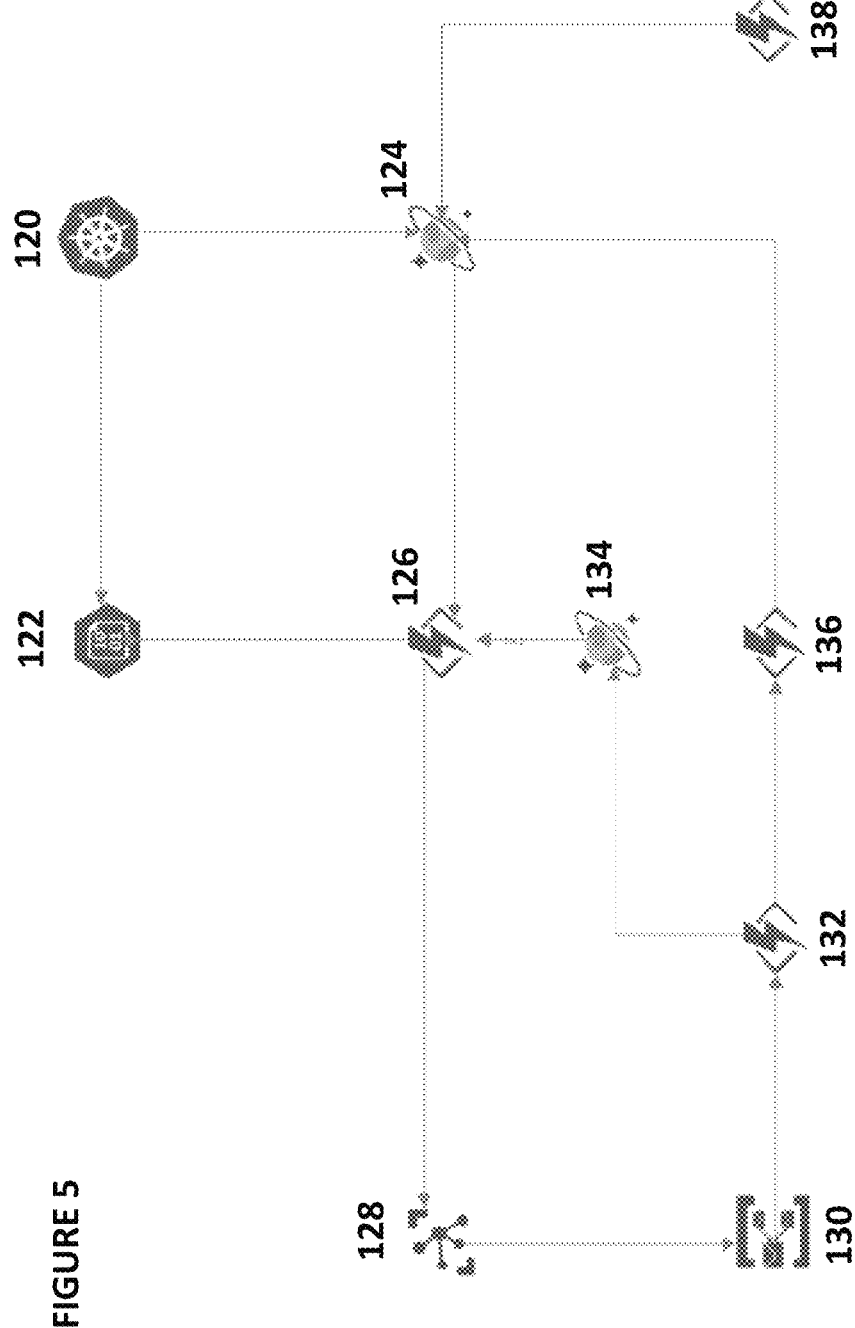
FIG. 5 illustrates exemplary architecture and process flow for software management services, including OTA services, in accordance with an embodiment herein.

FIG. 5 illustrates exemplary architecture and process flow for software management services, including OTA services, in accordance with an embodiment herein. The package API 120 facilitates upload of package to package storage 122. The package API 120 also accesses campaign store 124. Package evaluator 126 evaluates device metadata against criteria present in the package storage 122, creates campaigns and sets eligible device twins for upgrade through the IoT hub 128, device twin topic 130 and device twin function 132. Results of the device twin function 132 are stored 134 and provided to campaign response manager 136 for storage in campaign store 124. The campaign manager 138 updates the campaign store 124 with status upgrade for each device based on reported properties and overall progress of the campaign.

Figure 6:
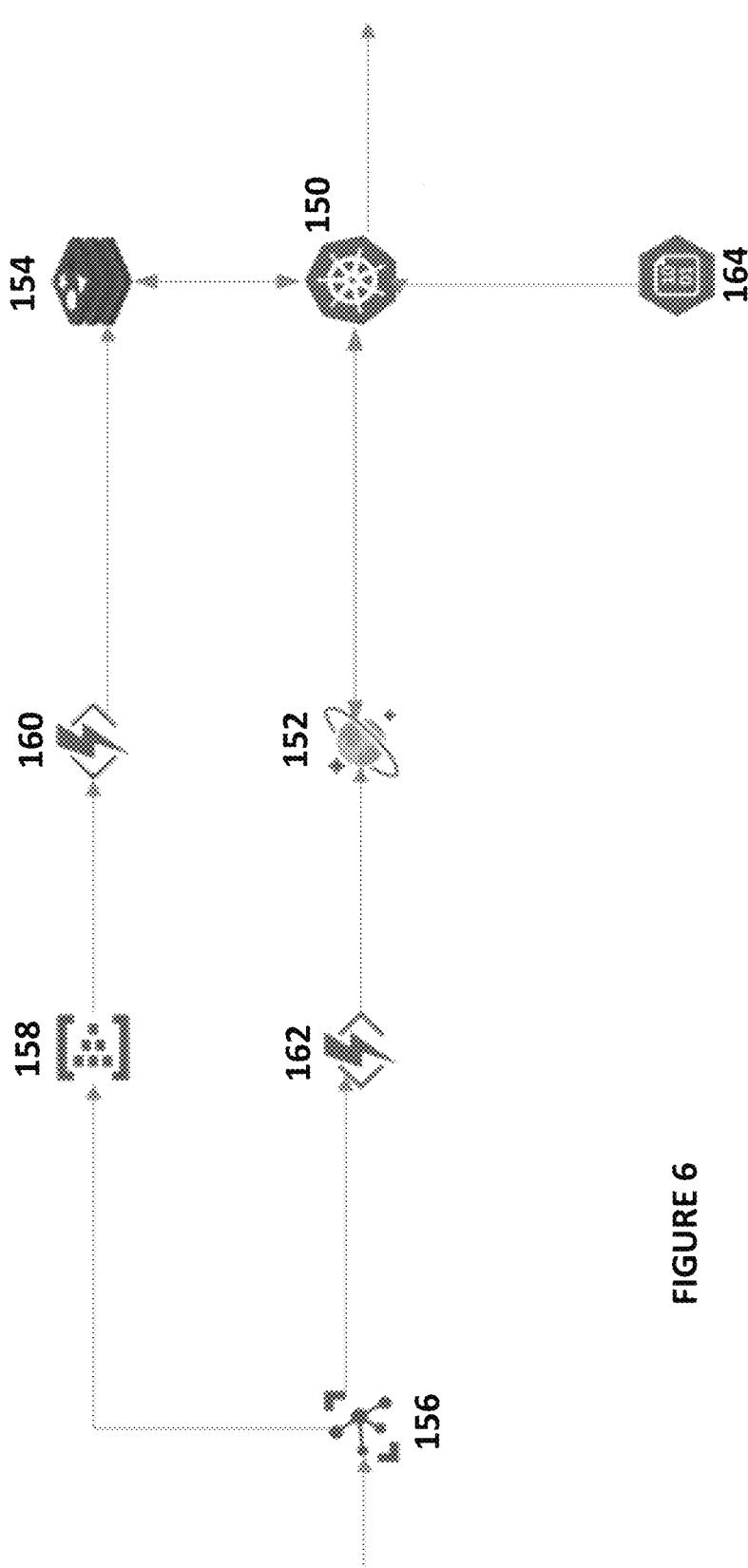
FIG. 6 illustrates exemplary architecture and process flow for telemetry services in accordance with an embodiment herein.

The telemetry services reusable components provide functionality to persist data in a generic schema and APIs to query out telemetry data, as well as the ability to fast access snapshot store to obtain latest values. FIG. 6 illustrates exemplary architecture and process flow for telemetry services in accordance with an embodiment herein. The telemetry API 150 facilitates queries to telemetry storage 152 for telemetry data for multiple devices and multiple parameters over a range of time and to snapshot storage 154 to get latest values of each telemetry parameter with time stamp along with min, max ranges. From IoT hub 156, individual telemetry event data, i.e., snapshots, are determined from telemetry event hub 158 request subject to snapshot persistence action 160 before results are stored in snapshot storage 154. Similarly, persistent telemetry data is determined by telemetry persistence function action 162 and stored in telemetry storage 152. Individual device model data is available to the telemetry API 150 from device model storage 164.

Figure 7:
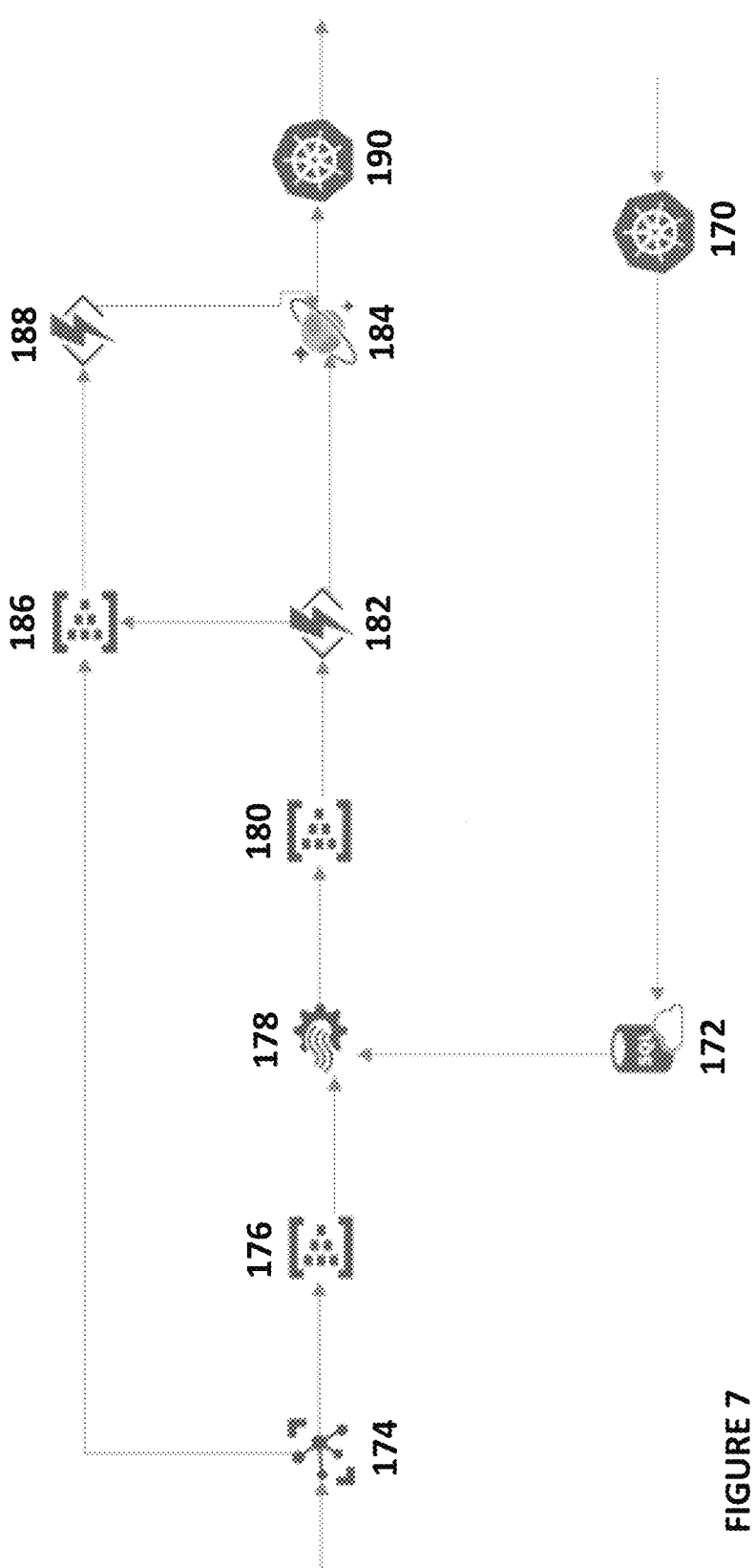
FIG. 7 illustrates exemplary architecture and process flow for dynamic rule engine services in accordance with an embodiment herein.

The dynamic rule engine services reusable components support creation of dynamic rules based on device model and application of defined rules. FIG. 7 illustrates exemplary architecture and process flow for telemetry services in accordance with an embodiment herein. Initially, the rules API 170 is used to defined rules based on device model and supports combining multiple conditions with logical operators. Rules are stored in rules database 172. From IoT hub 174 device telemetry data passes through telemetry event hub 176 and is subject to alarm stream analytics 178 by application of defined rules from rules database 172 on basis of device type. Resulting alarm messages from the analytics pass through alarms event hub 180 and are subject to alarms evaluation functions 182 to evaluate the telemetry message for all the applicable rule(s) and generate alarms with enriched data such as rule, conditions breached etc. Messages from the alarms evaluation function 182 are stored in alarms storage 184 and passed to alarm event hub 186 for alarms persistence action 188 and storage of rules engine generated alarms and device level hardware alarms in alarm storage 184. The alarms API 190 is used to query alarm data based on different search criteria.

Figure 8:
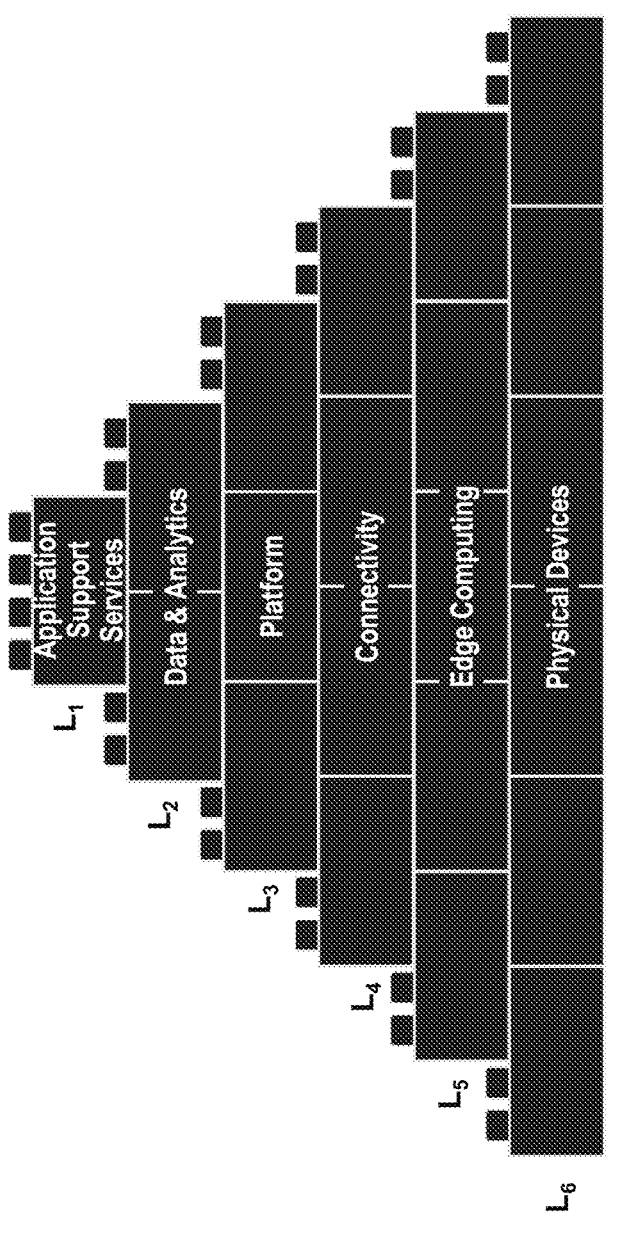
FIG. 8 illustrates a bricks to kits repeatable IoT solution in accordance with an embodiment herein.

The RA and RC drive rapid development of IoT solutions by offering business a bricks to kits repeatable solutions approach. Referring to FIG. 8, following the layers $L_1$ to $L_6$ of FIG. 1a, the reference architecture and toolkit of the embodiments herein provide: Application Support Services ($L_1$) with Location service, Weather Service, Traffic Service, Market Place, Testing Service, Device Simulator, Identity & Access Management, User Management, Key Management, and Logging; Data & Analytics ($L_2$) with Device Metadata Model, Asset Information Models, Platform Agnostic northbound interface for Telemetry Data, Device Metadata, Subscription Data, Customer Information, Dashboard, Admin Digital Twin Framework; Platform ($L_3$) with Device Management, Command and Control, Telemetry Services, Snapshot services, OTA Service, Dynamic Rule Engine; Connectivity ($L_4$) with Connectivity management module, Integration with device clouds for, e.g., LoRa, SigFox; Edge Computing ($L_5$) with Edge Architecture/Templates/Components, Protocols, BMS and 14.0 System Integration, OTA Update, Set of Pre-integrated Devices, Analytical Libraries for Common Scenarios; and Physical Devices ($L_6$) with Device Architecture/template/SDK for quick and secure device onboarding, and OTA update.

With the connected Reference Architecture & toolkit solution described herein, an enterprise can deliver a cloud-based platform that onboards and manages devices and users, provides public and private key encryption for connected devices, applications and data, and log management to track and manage security and performance across connected systems. Together, these foundational components present a reference architecture and toolkit which gives organizations a proven blueprint for quickly delivering secure, scalable and interoperable IoT products, services and solutions. The detailed recommendations, best practices and sample code assure a consistent, enterprise-wide approach to everything from interoperability and edge computing to industry-specific applications such as connected factories, connected vehicles and connected medical devices.

The invention claimed is:

1. A system for one or more Internet-of-Things (IoT) applications for enabling repeatable use cases on a cloud platform, the system comprising:
multiple IoT devices accessible by the one or more IoT applications;
an IoT hub connected to each of the multiple IoT devices for managing access to the multiple IoT devices by the one or more IoT applications;
a reference architecture including a set of architectural patterns for the one or more Internet-of-Things (IoT) applications; and
multiple sets of device-agnostic and cloud platform-agnostic individual repeatable code components including re-usable individual repeatable code components;
wherein the re-usable individual repeatable code components are selectable to support the one or more IoT applications to enable the repeatable use cases; and
further wherein the repeatable use cases require access to data from multiple individual IoT devices accessible through the IoT Hub and send a plurality of commands to multiple individual IoT devices accessible through the IoT Hub via the cloud platform to perform at least one of or a combination of data ingestion, routing and IoT device configuration, device management and device operations,
wherein the device management and device operations includes one more application programming interfaces (APIs) for managing a combination of enable, disable, deletion and setting properties of the multiple IoT devices, creation and storage of metamodels for the multiple IoT devices, and maintenance of IoT device metadata, and further wherein the device management and device operations remove throttling limitations required for queries to go through the IoT Hub,
wherein the plurality of commands are tracked for status and end-to-end lifecycle management.

2. The system of claim 1, wherein the one or more IoT applications are microservices selected from the group consisting of: data ingestion, data processing, integration with third-party systems, integration with enterprise systems, telemetry, real-time alerts, analytics, device management, roles and permissions, and over-the-air (OTA) service.

3. The system of claim 2, further comprising at least one cloud platform-dependent component for supporting the one or more Internet-of-Things (IoT) applications.

4. The system of claim 2, wherein the microservices are deployed using a container deployment and orchestration platform.

5. The system of claim 4, wherein communication between microservices and cloud platform-agnostic re-usable components is synchronous communication facilitated by RESTful application programming interface (API).

6. The system of claim 4, wherein communication between microservices and cloud platform-dependent components is asynchronous message-based communication facilitated by SDKs.

7. A method implemented on one or more processors for supporting one or more Internet-of-Things (IoT) applications for enabling repeatable use cases on a cloud platform in accordance with a predetermined reference architecture comprising:
provisioning, multiple re-usable components, including individual sets of repeatable code, the multiple re-usable components being selectable to support the one or more IoT applications to enable the repeatable use cases, wherein the repeatable use cases require access to data from multiple individual IoT devices accessible through IoT Hub and send plurality of commands to multiple individual IoT devices accessible through IoT Hub via the cloud platform to perform at least one of or a combination of data ingestion, routing and IoT device configuration and device management,
wherein the device management and device operations includes one more application programming interfaces (APIs) for managing a combination of enable, disable, deletion and setting properties of the multiple IoT devices, creation and storage of metamodels for the multiple IoT devices, and maintenance of IoT device metadata, and further wherein the device management and device operations remove throttling limitations required for queries to go through the IoT Hub,
wherein the plurality of commands are tracked for status and end-to-end lifecycle management; and
further wherein the multiple re-usable components are device-agnostic and cloud platform-agnostic.

8. The method of claim 7, wherein the one or more IoT applications are microservices selected from the group consisting of: data ingestion, data processing, integration with third-party systems, integration with enterprise systems, telemetry, real-time alerts, analytics, device management, roles and permissions, and over-the-air (OTA) service.

9. The method of claim 8, further comprising at least one cloud platform-dependent component for supporting the one or more Internet-of-Things (IoT) applications.

10. The method of claim 9, wherein the microservices are deployed using a container deployment and orchestration platform.

11. The method of claim 8, wherein communication between microservices and cloud platform-agnostic re-usable components is synchronous communication facilitated by RESTful application programming interface (API).

12. The method of claim 9, wherein communication between microservices and cloud platform-dependent components is asynchronous message-based communication facilitated by SDKs.

13. A non-transitory computer-readable medium storing instructions that, when executed by one or more computers, performs a process for engaging one or more microservices to support a repeatable use case which requires access to data from multiple individual devices accessible via a cloud platform, the process comprising:
initiating synchronous communication between the one or more microservices and at least one cloud platform-agnostic re-usable component, wherein the at least one cloud-agnostic re-usable component is a command management service re-usable component and the one or more microservices includes a command management service for sending commands to the multiple individual devices and tracking the commands for their status and end-to-end lifecycle management; and a device management and device operations service with external storage for meta model storage including one or more application programming interfaces (APIs) for managing a combination of enable, disable, deletion, setting properties of the multiple individual devices, creation and storage of metamodels for the multiple individual devices, and maintenance of device metadata to remove throttling limitations imposed when queries are required to go through the cloud platform; and initiating asynchronous message-based communication between the one or more microservices and cloud platform-dependent components.

14. The non-transitory computer-readable medium of claim 13, wherein instructions for initiating of synchronous communication between the one or more microservices and a cloud platform-agnostic re-usable component utilize RESTful application programming interface (API).

15. The non-transitory computer-readable medium of claim 13, wherein instructions for initiating asynchronous message-based communication between the one or more microservices and cloud platform-dependent components utilize SDKs.

16. The non-transitory computer-readable medium of claim 13, further storing instructions that, when executed by one or more computers, perform microservices selected from the group consisting of: data ingestion, data processing, integration with third-party systems, integration with enterprise systems, telemetry, real-time alerts, analytics, device management, roles and permissions, and over-the-air (OTA) service.

17. The non-transitory computer-readable medium of claim 13, further storing instructions that, when executed by one or more computers, deploy the one or more microservices using a container deployment and orchestration platform.

* * * * *